US012758979B2

(12) United States Patent
Chen et al.

(10) Patent No.: US 12,758,979 B2

(45) Date of Patent: Oct. 13, 2026

(54) PLANETARY BALL MILL AND PLANETARY BALL MILLING SYSTEM FOR THE PRODUCTION OF NANO-SCALE OR LARGER SIZED POWDERS

(71) Applicant: ABM Nano LLC, Missouri City, TX (US)

(72) Inventors: Shizhu Chen, Kanata (CA); Hui Li, Sugar Land, TX (US); Zhuo Chen, Sugar Land, TX (US); Pufang Xiao, Kanata (CA)

(73) Assignee: ABM Nano LLC, Missouri City, TX (US)

( * ) Notice: Subject to any disclaimer, the term of this patent is extended or adjusted under 35 U.S.C. 154(b) by 288 days.

(21) Appl. No.: 18/639,915

(22) Filed: Apr. 18, 2024

(65) Prior Publication Data

US 2024/0316566 A1 Sep. 26, 2024

Related U.S. Application Data

(63) Continuation of application No. PCT/US2022/078346, filed on Oct. 19, 2022.

(60) Provisional application No. 63/257,825, filed on Oct. 20, 2021.

(51) Int. Cl.

*B02C 17/08* (2006.01)
*B02C 17/10* (2006.01)
*B02C 17/18* (2006.01)
*B02C 23/18* (2006.01)

(52) U.S. Cl.

CPC .............. *B02C 17/08* (2013.01); *B02C 17/10* (2013.01); *B02C 17/18* (2013.01); *B02C 23/18* (2013.01)

(58) Field of Classification Search

CPC ................................ B02C 17/08; B02C 17/14

See application file for complete search history.

(56) References Cited

U.S. PATENT DOCUMENTS

| | | | |
|---|---|---|---|
| 3,524,735 | A | 8/1970 | Oetiker |
| 6,126,097 | A | 10/2000 | Chen |
| 6,334,583 | B1 | 1/2002 | Li |
| 7,744,027 | B2 | 6/2010 | Nagao |

(Continued)

FOREIGN PATENT DOCUMENTS

| | | |
|---|---|---|
| CN | 103861698 A | 6/2014 |
| CN | 204841832 U | 12/2015 |

(Continued)

OTHER PUBLICATIONS

International Preliminary Report on Patentability received for PCT Patent Application No. PCT/US2022/078346, mailed on May 2, 2024, 12 pages.

(Continued)

*Primary Examiner* — Jared O Brown

(74) *Attorney, Agent, or Firm* — Dilworth IP, LLC

(57) ABSTRACT

A planetary ball milling system comprises a planetary ball mill including a central axis, a hub, and a plurality of milling pots surrounding the central axis. In some examples, the milling pots are configured to be transitioned between horizontal and vertical positions during operation of the planetary ball mill. The planetary ball milling system can further include vibrating impacting rods for vibrating and striking the milling pots, and nozzles for dispersing a cooling agent onto a surface of the milling pots.

19 Claims, 1 Drawing Sheet

(56) References Cited

U.S. PATENT DOCUMENTS

| | | | | |
|---|---|---|---|---|
| 2006/0097093 | A1 | 5/2006 | Hockmeyer | |
| 2008/0197223 | A1* | 8/2008 | Nagao | B02C 17/08 241/175 |
| 2014/0117131 | A1* | 5/2014 | Gouko | B02C 17/08 241/175 |
| 2024/0326062 | A1* | 10/2024 | Mutter | B02C 17/08 |

FOREIGN PATENT DOCUMENTS

| | | | | | |
|---|---|---|---|---|---|
| CN | 105665082 | A | * | 6/2016 | B02C 17/22 |
| CN | 106964434 | A | * | 7/2017 | B02C 17/16 |
| CN | 108855426 | A | | 11/2018 | |
| KR | 2001-0112144 | A | | 12/2001 | |
| KR | 200264704 | Y1 | * | 2/2002 | |
| WO | 2009/001397 | A2 | | 12/2008 | |

OTHER PUBLICATIONS

International Search Report and Written Opinion received for PCT Patent Application No. PCT/US2022/078346, mailed on Mar. 6, 2023, 13 pages.

First Office Action in CN Patent Application No. 202280071025.3 dated Mar. 26, 2026.

* cited by examiner

PLANETARY BALL MILL AND PLANETARY BALL MILLING SYSTEM FOR THE PRODUCTION OF NANO-SCALE OR LARGER SIZED POWDERS

RELATED APPLICATIONS

The present application is a continuation of Patent Cooperation Treaty (PCT) application no. PCT/US2022/078346 filed Oct. 19, 2022, which claims the priority of U.S. Provisional Application No. 63/257,825, filed on Oct. 20, 2021, each of which is incorporated herein by reference in its respective entirety for all purposes.

FIELD

The present disclosure relates to planetary ball mills, and more specifically to planetary ball mills and planetary ball milling systems for producing nano-scale or larger sized powders.

BACKGROUND

Nanotechnology is an emerging industry with wide-ranging applications. Currently, nanoparticles are produced using four broad techniques: a vacuum technique, a gas-phase technique, a condensed-phase synthesis technique, and a mechanical grinding technique.

The conventional mechanical grinding technique utilizes ball mills. However, the conventional mechanical grinding technique suffers from severe drawbacks, such as, but not limited to, meager production rates and poor grinding efficiency. It is not unusual to find a production rate of several grams a day produced by a laboratory-scale device.

If the power and efficiency of ball mills could be improved, mechanical grinding methods can become a viable mass production method for preparing nano-scale powders. Accordingly, an improved ball mill is needed.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some aspects of the present disclosure relate to a planetary ball mill comprising: a central axis; a hub, where the hub is fixed to the central axis, and where the hub is configured to be rotated with the central axis during operation of the planetary ball mill; a plurality of milling pots disposed around the central axis, where each of the milling pots is connected to the hub, where each of the milling pots is concurrently configured to be rotated around its own axis and around the central axis during operation of the planetary ball mill, and where each of the milling pots is configured to be transitioned from a vertical orientation to a horizontal orientation during operation of the planetary ball mill, where, in the vertical orientation, a center line of each of the milling pots is parallel to the central axis and orthogonal to the hub, and where, in the horizontal orientation, a center line of each of the milling pots is orthogonal to the central axis and parallel to the hub.

Further aspects of the present disclosure relate to a planetary ball mill comprising: a central axis; a hub, where the hub is orthogonal to the central axis, and where the hub is configured to be rotated with the central axis during operation of the planetary ball mill; a plurality of milling pots disposed around the central axis, where each of the milling pots is connected to the hub, where each of the milling pots is configured to be concurrently rotated around the central axis and its own axis during operation of the planetary ball mill, and where each of the milling pots is configured to be transitioned from a vertical orientation to a horizontal orientation during operation of the planetary ball mill and stationary ring surrounding the central axis, where the central axis is configured to transition from a top position to a bottom position and from the bottom position to the top position, where in the bottom position, each of the milling pots is in the vertical orientation, where in the top position, each of the milling pots is in the horizontal orientation; where, in the vertical orientation, a center line of each of the milling pots is parallel to the central axis and orthogonal to the hub, and where, in the horizontal orientation, a center line of each of the milling pots is orthogonal to the central axis and parallel to the hub.

Additional aspects of the present disclosure relate to a planetary ball mill comprising a central axis; a plurality of milling pots disposed around the central axis, where each of the milling pots is connected to the hub, where each of the milling pots is configured to be rotated around the central axis during operation of the planetary ball mill, and where each of the milling pots is configured to be transitioned from a vertical orientation to a horizontal orientation during operation of the planetary ball mill; where, in the vertical orientation, a center line of each of the milling pots is parallel to the central axis, and where, in the horizontal orientation, a center line of each of the milling pots is orthogonal to the central axis.

Some aspects of the present disclosure relate to a planetary ball milling system comprising: a planetary ball mill, where the planetary ball mill comprises: a central axis; a hub, where the hub is orthogonal to the central axis, and where the hub is configured to be rotated with the central axis during operation of the planetary ball mill; a plurality of milling pots disposed around the central axis, where each of the milling pots is connected to the hub, where each of the milling pots is configured to be concurrently rotated around the central axis as well as its own axis during operation of the planetary ball mill, and where each of the milling pots is configured to be transitioned from a vertical orientation to a horizontal orientation during operation of the planetary ball mill; where, in the vertical orientation, a center line of each of the milling pots is parallel to the central axis and orthogonal to the hub, and where, in the horizontal orientation, a center line of each of the milling pots is orthogonal to the central axis and parallel to the hub; a plurality of impacting rods, where the impacting rods are disposed above the milling pots, where the impacting rods are configured to strike the plurality of milling pots while the milling pots are in the horizontal orientation; and a plurality of nozzles, where the nozzles are disposed above the milling pots, where the nozzles are configured to disperse a cooling agent onto a surface of the plurality of milling pots while the milling pots are in the horizontal orientation and rotating around their own axes.

BRIEF DESCRIPTION

FIG. 1 is a schematic sketch of an exemplary planetary ball mill when the central axis is at a bottom position according to some aspects of the present disclosure.

FIG. 2 depicts an operational situation where the milling pots are rotating atop a stationary ring when the central axis is at a top position according to some aspects of the present disclosure.

Figure 1:
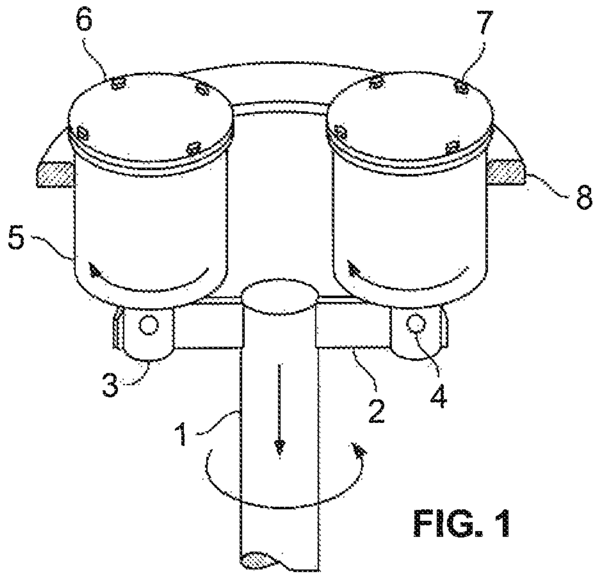
FIG. 1 depicts an example planetary ball mill according to some aspects of the present disclosure. Specifically.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

One general aspect of the present disclosure relates to a planetary ball mill.

In certain examples, the planetary ball mill may comprise a central axis, which may be an upright central axis. In some implementations, the central axis can rotate both clockwise and counterclockwise and move up or down. Certain embodiments may include the upright central axis as a circular axis with key grooves or as a polygynous axis.

In certain examples, the planetary ball mill may further comprise a hub, which may be a wing-shaped hub comprising evenly distributed wing-shape boards. In some examples, the wing-shaped hub may be fixed at the top of the upright central axis. In some implementations, an even number of wing-shaped boards are affixed to the wing-shaped hub. In some examples, for each wing-shaped board, an angle between a first wing-shaped board and a second wing-shaped board are the same. In some examples, the first wing-shaped board and the second wing-shaped board are a singular piece. In some examples, the first wing-shaped board and the second wing-shaped board are multiple pieces. In some examples, each wing-shaped board is symmetrical with respect to the central axis. In some examples, each wing-shaped hub is affixed to a top of the central axis. Some embodiments may comprise even-distributed wing-shape boards. In some examples, the plane of each wing-shaped boards is perpendicular to a central line of the upright central axis.

In certain examples, swingable shafts may be hinged to the wing-shaped boards. In some examples, the swingable shafts may be hinged to the wing-shaped boards by rotatable fasteners, such as, but not limited to dowels. In some embodiments, the swingable shafts are configured to rotate around the rotatable fastener.

In some examples, a plurality of milling pots is supported by the swingable shafts. Certain implementations include the milling pots being connected to the end of the wing-shaped boards by the swingable shafts. In some implementations, the milling pots can revolve around a central line of the shaft. In some implementations, the milling pots can revolve around their own axes. In some examples each milling pot can be sealed with an inert gas or liquid using a gasket between each milling pot and a respective lid. In some embodiments, each milling pot may be fastened to a lid by a suitable fastener, such as, but not limited to, screws.

In some examples, the planetary ball mill further comprises a stationary ring. In some examples, the stationary ring comprises a vertical inside wall and horizontal top surface. In some examples, a central line of the stationary ring is the same as the central line of the upright central axis. In some examples, a center line of each swingable shaft may be angled from 0° to 90°, 30° to 90°, 60° to 90°, 0° to 60°, 0° to 30°, 30° to 60°, or any combination thereof relative to a top of the stationary ring during operation of the planetary ball mill. In some examples, a center line of each swingable shaft is angled at either a 0° position or a 90° position during operation of the planetary ball mill.

In certain implementations, the angle may deviate ±30°. For instance, in some examples, a center line of each swingable shaft is angled at either a 0°±30° position or a 90°±30° position during operation of the planetary ball mill. For instance, in some examples, a center line of each swingable shaft may be angled from −30° to 120°, −30° to 90°, −30° to 60°, −30° to 30°, −30° to 0°, 0° to 120°, 30° to 120°, 60° to 120°, 90° to 120°, 0° to 90°, 30° to 60°, or any combination thereof relative to a top of the stationary ring during operation of the planetary ball mill In some examples the planetary ball mill is a part of a planetary ball milling system.

The planetary ball milling system may, in certain examples, include at least one impacting rod for impacting outer walls of the milling pots. Some embodiments may include the at least one impacting rod having round, spherical, triangular, rectangular, or irregular shapes. In some examples, each impacting rod is above a corresponding milling pot during operation of the planetary ball mill. In some examples, each impacting rod is above a corresponding milling pot while the milling pot rolls on top of the stationary ring. In some embodiments, during operating of the planetary ball milling system, each impacting rod may be disposed at an angle of: 15° to 165°, 45° to 165°, 75° to 165°, 105° to 165°, 135° to 165°, 15° to 135°, 15° to 105°, 15° to 75°, 15° to 45°, 45° to 135°, 75° to 105°, or any combination thereof, where the angle is measured relative to a rotational axis of each milling pot. In some embodiments, the at least one impacting rod are configured to impact at least one outer wall of the milling pots. In some examples, an impacting strength or impacting frequency can be controlled by a power source such as, but not limited to mechanical, electric, magnetic, ultrasonic or other power sources. In some examples, each impacting rod is a vibrating impacting rod that is configured to vibrate when controlled by a power source such as, but not limited to a mechanical, electric, magnetic, ultrasonic or other power source.

The planetary ball milling system may, in certain examples, include at least one spray nozzle configured to spray at least one cooling agent onto a surface of the milling pots. In certain implementations, each spray nozzle is positioned above a corresponding mill pot. In some examples, each impacting rod is above a corresponding milling pot while the milling pot rolls on top of the stationary ring. In some examples, the at least one cooling agent may comprise water, oil, at least one gas, at least one refrigerant, or any combination thereof. In some implementations, the at least one cooling agent may be cooled down and recycled during operation of the system.

Figure 2:
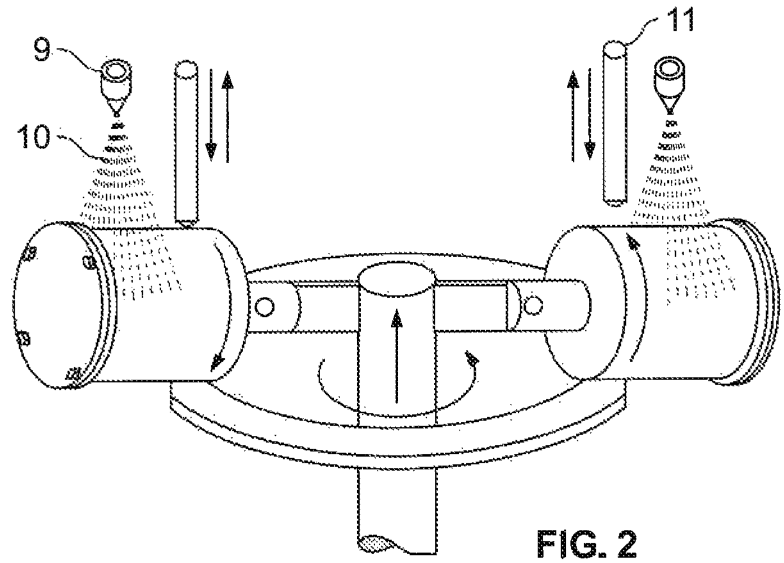
FIG. 2 depicts an example planetary ball milling system according to some aspects of the present disclosure. Specifically.
Figure 3:
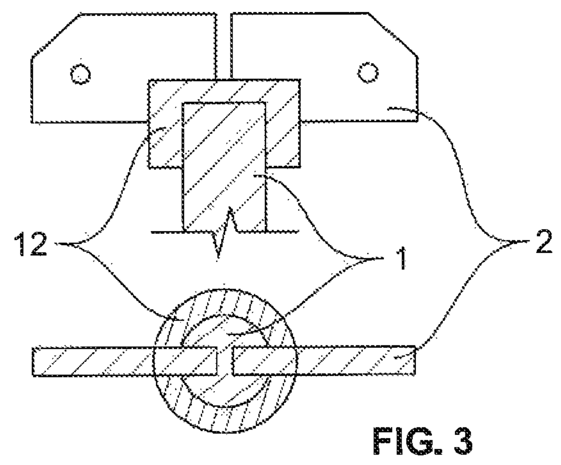
FIG. 3 depicts an example of a hub according to some aspects of the present disclosure.

As shown in FIGS. 1 to 3, one exemplary planetary ball mill and planetary ball milling system of the present disclosure may comprise the following components: an upright central axis 1 configured to rotate clockwise or counterclockwise and move up or down (i.e., from a top position to a bottom position and vice versa); a wing-shaped hub 12 affixed atop of the central axis 1, swingable shafts 3, milling pots 5, a stationary ring 8, impacting rods 11, and nozzles 9.

In some examples, when the upright central axis 1 rotates at a bottom position as shown in FIG. 1, the milling pots 5 are configured to concurrently rotate with central axis 1. In certain implementations, due to centrifugal force, the milling pots 5 may be pushed to touch an inside wall of the stationary ring 8. In certain embodiments, the milling pots 5 may rotate around its own swingable axis, resulting in the milling pots 5 having a planetary movement.

In certain implementations, the upright central axis 1 may be configured to translate (i.e., move up and down) and rotate. In some examples, the milling pots 5 will tilt outward at a certain angle relative to the upright central axis 1. In one example, as shown in FIG. 2, the angle is 90° (i.e., the milling pots 5 are orthogonal to the upright central axis) and the milling pots 5 are shown rolling on top of the stationary ring 8. In some examples, the impacting rods 11 are positioned above a corresponding milling pot 5, such that the impacting rods 11 can impact an outer wall of the milling pot 5 during operation of the planetary ball mill. In some examples, a powder within the planetary ball mill may be dispersed due to agitation caused by the impacting rods 11. In some implementations, nozzles 9 positioned above a corresponding milling pot 5 may spray the milling pots 5 with a cooling agent 10, such that a temperature of the powder within the milling pot 5 may be reduced.

As shown in FIG. 3, the planetary ball mill may, according to certain examples comprise a wing-shaped hub 12. In some examples, an even number of wing-shaped boards 2 may be evenly positioned on the wing-shaped hub 12 with the wing-shaped hub 12 affixed atop the central axis 1. As shown in FIG. 1, milling pot 5 may, in some instances, be rotatably positioned atop of the swingable shafts 3, with the swingable shafts 3 hinged to the wing-shaped boards 2 of the wing-shaped hub 12 by rotatable fasteners 4, such as but not limited to dowels.

According to some embodiments, when the central axis 1 rotates as shown in FIG. 1, the wing-shaped board 2 and may also rotate. In one or more embodiments, the milling pots 5 may rotate around the central axis 1 and around their own axes via the swingable shafts 3. In certain examples, the milling pots 5 may contact an inside wall of the stationary ring 8 while in the vertical position, as shown in FIG. 1. In some examples, due to centrifugal forces, the milling pots 5 may rotate around their own axes and revolve around said central axis 1, in a planet-like manner.

Some examples of the milling pots 5 may include lid 6 fastened to the milling pots 5 by fasteners 7, such as, but not limited to screws. In some examples, after the upright central axis 1 can be controlled to move the milling pots 5 onto the stationary ring 8 to the top position (as shown in FIG. 2), thereby causing the milling pots 5 to rotate while supported by stationary ring 8, as shown in FIG. 2. In some implementations, the impacting rods 11, each located above a corresponding milling pot 5, may impact an outer wall of each milling pot 5. The impacting rods 11, may in certain instances, be continually driven by a power source (e.g., mechanical, electric, magnetic or some other power source). In certain cases, nozzles 9 may spray a cooling agent 10 onto the milling pots to reduce a temperature of a powder inside the milling pots 5. In some examples, after the temperature of the powder in the milling pots 5 is reduced, the central axis 1 may be reverted to the bottom position shown in FIG. 1.

In some examples, the upright central axis 1 can move down from the top position shown in FIG. 2 to the bottom position shown in FIG. 1 and vice versa. As shown in the non-limiting example of FIG. 1, the upright central axis 1 is positioned beneath stationary ring 8 in the bottom position, with the milling pots 5 in a vertical orientation supported by swingable shafts 3. As shown in the non-limiting example of FIG. 2, the upright central axis 1 is positioned above stationary ring 8 in the top position, with the milling pots 5 in a horizontal orientation rotating on stationary ring 8.

In some examples, transitioning the upright central axis 1 from the bottom position (see, FIG. 1) to a top position (see, FIG. 2) actuates the swingable shafts 3 around the dowels 4 in a hinge motion. The actuation of the hinge comprising the swingable shafts 3 and the dowels 4, may in certain examples, transition the milling pots 5 from the vertical orientation to the horizontal orientation. In one or more further embodiments transitioning the upright central axis 1 from a top position to a bottom position de-actuates the hinge, thereby reverting the milling pots 5 from the horizontal orientation to the vertical orientation. During operation, in some examples, transitioning the central axis 1 from the bottom position to the top position and vice versa may be repeated until a powder inside the milling pots 5 reaches a target particle size. Such a process may, in some embodiments, be controlled (e.g., using a controller and associated computer software).

In certain implementations, there are multiple configurations for the vertical orientation of the milling pots 5. In one exemplary configuration, during operation, the milling pots 5 start in the horizontal position and the central axis 1 moves upwardly to transition the milling pots 5 to a vertical orientation with the milling pots 5 being "upside down" (i.e., with the lid 6 oriented downwardly). In another exemplary configuration, the milling pots 5 also start in the horizontal position, but the central axis 1 moves downwardly to transition the milling pots 5 to a vertical orientation with the milling pots 5 being "upright" (i.e., with the lid 6 oriented upwardly). In some examples, one vertical configuration ("upside down" or "upright") is used during operation of the planetary ball mill. In other examples, both vertical configurations are used during operation of the planetary ball mill. In some examples, the planetary ball mill transitions between at least three different stages during operation including, but not limited to: vertical/upside down; horizontal; and vertical/upright, where the name of each respective stage refers to a respective position of the milling pots 5 during that stage.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A planetary ball milling system comprising:

a planetary ball mill including:

a central axis;

a hub arranged orthogonal to the central axis and configured to be rotated around the central axis during operation of the planetary ball mill;

a plurality of milling pots disposed around the central axis and connected to the hub, each of the plurality of milling pots having a longitudinal center line, wherein each of the plurality of milling pots is configured to be concurrently rotated around the central axis and a respective longitudinal center line during operation of the planetary ball mill, and wherein each of the plurality of milling pots is configured to be transitioned from a vertical orientation to a horizontal orientation during operation of the planetary ball mill;

wherein the longitudinal center line of each of the plurality of milling pots is parallel to the central axis and orthogonal to the hub when in the vertical orientation, and wherein the longitudinal center line of each of the plurality of milling pots is orthogonal to the central axis and parallel to the hub when in the horizontal orientation;

a plurality of vibrating impacting rods disposed above the milling pots and configured to vibrate and strike the plurality of milling pots while the plurality of milling pots are in the horizontal orientation; and a plurality of nozzles disposed above the plurality of milling pots and configured to disperse a cooling agent onto a surface of the plurality of milling pots while the plurality of milling pots are rotating in the horizontal orientation.

2. The planetary ball milling system of claim 1, further comprising a stationary ring; wherein the plurality of vibrating impacting rods are configured to strike the plurality of milling pots while the plurality of milling pots are rotating on top of the stationary ring and around the central axis.

3. The planetary ball milling system of claim 1, wherein the plurality of vibrating impacting rods are configured to stop vibrating and striking the plurality of milling pots during a transition from the horizontal orientation to the vertical orientation.

4. The planetary ball milling system of claim 1, wherein the cooling agent is configured to be cooled down and recycled in a continuous ball milling process.

5. The planetary ball milling system of claim 1, wherein the plurality of nozzles is configured to disperse the cooling agent to the plurality of milling pots while the plurality of milling pots concurrently rotate on top of a stationary ring and the central axis.

6. The planetary ball milling system of claim 1, wherein the plurality of nozzles is configured to stop dispersing the cooling agent during a transition from the horizontal orientation to the vertical orientation.

7. The planetary ball milling system of claim 1, wherein the plurality of milling pots are configured to be sealed to prevent the cooling agent from leaking into the plurality of milling pots.

8. The planetary ball milling system of claim 1, wherein the plurality of milling pots are configured to be sealed with an inert gas or a liquid solvent.

9. A planetary ball milling system comprising:

a planetary ball mill including:

a central axis;

a hub arranged orthogonal to the central axis and configured to be fixed on top of the central axis during operation of the planetary ball mill; and a plurality of milling pots disposed around the central axis and connected to the hub, each of the plurality of milling pots having a longitudinal center line, wherein each of the plurality of milling pots is configured to be concurrently rotated around a respective longitudinal center line and around the central axis during operation of the planetary ball mill, and where in each of the plurality of milling pots is configured to be transitioned from a horizontal orientation to a plurality of vertical orientations during operation of the planetary ball mill;

wherein the longitudinal center line of each of the plurality of milling pots is parallel to the central axis and orthogonal to the hub when in each of the plurality of vertical orientations, and wherein the longitudinal center line of each of the plurality of milling pots is orthogonal to the central axis and parallel to the hub when in the horizontal orientation; and a plurality of vibrating impacting rods disposed above the plurality of milling pots and configured to vibrate and strike the plurality of milling pots while the plurality of milling pots are in the horizontal orientation.

10. The planetary ball milling system of claim 9, wherein the plurality of vertical orientations comprises an upright vertical orientation, and wherein a respective lid of each of the plurality of milling pots is oriented upwardly when in the upright vertical orientation.

11. The planetary ball milling system of claim 9, wherein the plurality of vertical orientations comprises an upside-down vertical orientation, and wherein a respective lid of each of the plurality of milling pots is oriented downwardly when in the upside-down vertical orientation.

12. The planetary ball milling system of claim 9, further comprising a plurality of nozzles above the plurality of milling pots and configured to disperse a cooling agent onto a surface of the plurality of milling pots while the plurality of milling pots are rotating in the horizontal orientation.

13. The planetary ball milling system of claim 9, further comprising a stationary ring; wherein the vibrating impacting rods are configured to strike the plurality of milling pots while the milling pots are rotating on top of the stationary ring and around the central axis.

14. The planetary ball milling system of claim 9, wherein the plurality of vibrating impacting rods are configured to stop vibrating and striking the plurality of milling pots during a transition from the horizontal orientation to the plurality of vertical orientations.

15. The planetary ball milling system of claim 12, wherein the cooling agent is configured to be cooled down and recycled in a continuous ball milling process.

16. The planetary ball milling system of claim 12, wherein the plurality of nozzles are configured to disperse the cooling agent to the plurality of milling pots while the plurality of milling pots concurrently rotate on top of a stationary ring and the central axis.

17. The planetary ball milling system of claim 12, wherein the plurality of nozzles are configured to stop dispersing the cooling agent during a transition from the horizontal orientation to the plurality of vertical orientations.

18. The planetary ball milling system of claim 12, wherein the plurality of milling pots are configured to be sealed to prevent the cooling agent from leaking into the plurality of milling pots.

19. The planetary ball milling system of claim 9, wherein the plurality of milling pots are configured to be sealed with an inert gas or a liquid solvent.

* * * * *